United States Patent
Desai et al.

(10) Patent No.: US 9,606,998 B2
(45) Date of Patent: *Mar. 28, 2017

(54) EXTENDING A CONTENT REPOSITORY USING AN AUXILIARY DATA STORE

(71) Applicant: International Business Machines Corporation, Armonk, NY (US)

(72) Inventors: Rajesh M. Desai, San Jose, CA (US); Magesh Jayapandian, San Jose, CA (US); Aidon P. Jennery, El Sobrante, CA (US); Justo L. Perez, Salinas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/298,111

(22) Filed: Jun. 6, 2014

(65) Prior Publication Data

US 2015/0100550 A1   Apr. 9, 2015

Related U.S. Application Data

(63) Continuation of application No. 14/045,089, filed on Oct. 3, 2013.

(51) Int. Cl.
  *G06F 7/00*   (2006.01)
  *G06F 17/00*  (2006.01)
  *G06F 17/30*  (2006.01)

(52) U.S. Cl.
  CPC .. *G06F 17/30091* (2013.01); *G06F 17/30011* (2013.01); *G06F 17/3023* (2013.01); *G06F 17/30174* (2013.01)

(58) Field of Classification Search
  CPC ......... G06F 17/30011; G06F 17/30091; G06F 17/30174; G06F 17/3023
  See application file for complete search history.

(56) References Cited

U.S. PATENT DOCUMENTS 6,820,091 B2   11/2004   Weigelt
7,158,969 B2   1/2007    Dettinger et al.
(Continued)

OTHER PUBLICATIONS

Chang et al., "Bigtable: A Distributed Storage System for Structured Data", 2006, http://static.googleusercontent.com/external_content/untrusted_dlcp/research.google.com/en/us/archive/bigtable-osdi06.pdf, 14 pages.
(Continued)

*Primary Examiner* — Taelor Kim
(74) *Attorney, Agent, or Firm* — Joe Polimeni; SVL IPLaw Edell, Shapiro & Finnan, LLC

(57) ABSTRACT

According to one embodiment of the present invention, a system extends a content repository by creating an auxiliary data store outside of the content repository and storing auxiliary data in the auxiliary data store, wherein the auxiliary data is associated with a collection of documents in the content repository. The system stores version information for the auxiliary data store and records of operations against the auxiliary data store in a log in the repository. In response to receiving a request for an operation against the auxiliary data store, the system determines that the auxiliary data store and repository are consistent based on the version information and applies the operation against the auxiliary data store. Embodiments of the present invention further include a method and computer program product for extending a content repository data model in substantially the same manners described above.

5 Claims, 5 Drawing Sheets

(56) References Cited

U.S. PATENT DOCUMENTS

| | | |
|---|---|---|
| 7,257,690 B1 | 8/2007 | Baird |
| 7,831,544 B1 | 11/2010 | Panchbudhe et al. |
| 2005/0108684 A1* | 5/2005 | Sohn .................. G06F 8/20 717/120 |
| 2008/0313198 A1* | 12/2008 | Kim ................ G06F 17/30174 |
| 2009/0164522 A1 | 6/2009 | Fahey |
| 2010/0250538 A1 | 9/2010 | Richards et al. |
| 2011/0078114 A1* | 3/2011 | Herbeck ........... G06F 17/30011 707/638 |
| 2011/0225129 A1 | 9/2011 | Agrawal |
| 2012/0159446 A1 | 6/2012 | Jentsch et al. |
| 2012/0246130 A1 | 9/2012 | Schmidt |
| 2012/0303559 A1 | 11/2012 | Dolan |
| 2013/0006940 A1 | 1/2013 | Garza et al. |
| 2013/0110789 A1* | 5/2013 | Braam ................ G06F 11/1435 707/675 |
| 2014/0222758 A1* | 8/2014 | March ................. G06F 17/3023 707/638 |
| 2015/0100549 A1 | 4/2015 | Desai et al. |

OTHER PUBLICATIONS

IBM, "eDiscovery Analyzer", http://pic.dhe.ibm.com/infocenter/email/v2r2m0/index.jsp?topic=%2Fcom.ibm.emailtoc.doc%2Fedaao000.htm, 2010, 3 pages.

Wikipedia, "Electronic discovery", http://en.wikipedia.org/wiki/Electronic_discovery, Sep. 23, 2013, 6 pages.

\* cited by examiner

| CASE ID | OFFSET | TYPE | SERIALIZED FIELD |
|---|---|---|---|
| JULY_MEMOS | 0 | CUSTODIAN | `<operation>`<br>  `<operationType>Add</operationType>`<br>  `<custodian>`<br>    `<id>5362</id>`<br>    `<firstName>John</firstName>`<br>    `<lastName>Doe</lastName>`<br>    `<email>jdoe@ibm.com</email>`<br>  `</custodian>`<br>`</operation>` |
| JULY_MEMOS | 1 | CUSTODIAN | `<operation>`<br>  `<operationType>Add</operationType>`<br>  `<custodian>`<br>    `<id>1407</id>`<br>    `<firstName>Jane</firstName>`<br>    `<lastName>Smith</lastName>`<br>    `<email>jsmith@ibm.com</email>`<br>  `</custodian>`<br>`</operation>`<br>`<operation>`<br>  `<operationType>Delete</operationType>`<br>  `<custodian>`<br>    `<id>5362</id>`<br>  `</custodian>`<br>`</operation>` |

FIG.3

«EXTENDING A CONTENT REPOSITORY USING AN AUXILIARY DATA STORE»

CROSS-REFERENCE TO RELATED APPLICATIONS

This application is a continuation of U.S. patent application Ser. No. 14/045,089, entitled "EXTENDING A CONTENT REPOSITORY USING AN AUXILIARY DATA STORE" and filed Oct. 3, 2013, the disclosure of which is incorporated herein by reference in its entirety.

BACKGROUND

1. Technical Field

Present invention embodiments relate to storage structures for content repositories, and more specifically, to extending content repository data models using auxiliary data stores external to the repository.

2. Discussion of the Related Art

Electronic discovery applications require increasingly rich metadata for data stored in repositories. For example, defensible disposal depends on statistics computed for stored content in order to estimate the retention costs of litigation holds. Generally, metadata is stored within the repository itself. In one approach, data and metadata are co-located within the repository. In this case, each metadata field is provided for each data item. When the schema is changed, preexisting data is migrated to conform to the new schema. Alternatively, the data and metadata can be connected via a linking mechanism. This incurs an additional retrieval cost. Since a repository may serve applications with diverse performance and scale requirements, neither approach may be optimal for each application.

BRIEF SUMMARY

According to one embodiment of the present invention, a system extends a content repository by creating an auxiliary data store outside of the content repository and storing auxiliary data in the auxiliary data store, wherein the auxiliary data is associated with a collection of documents in the content repository. The system stores version information for the auxiliary data store and records of operations against the auxiliary data store in a log in the repository. In response to receiving a request for an operation against the auxiliary data store, the system determines that the auxiliary data store and repository are consistent based on the version information and applies the operation against the auxiliary data store. Embodiments of the present invention further include a method and computer program product for extending a content repository data model in substantially the same manners described above.

BRIEF DESCRIPTION OF THE SEVERAL VIEWS OF THE DRAWINGS

Generally, like reference numerals in the various figures are utilized to designate like components.

FIG. 3 depicts an example structure for recording auxiliary data store operations in a data-model extension log according to an embodiment of the present invention.

DETAILED DESCRIPTION

Figure 1:
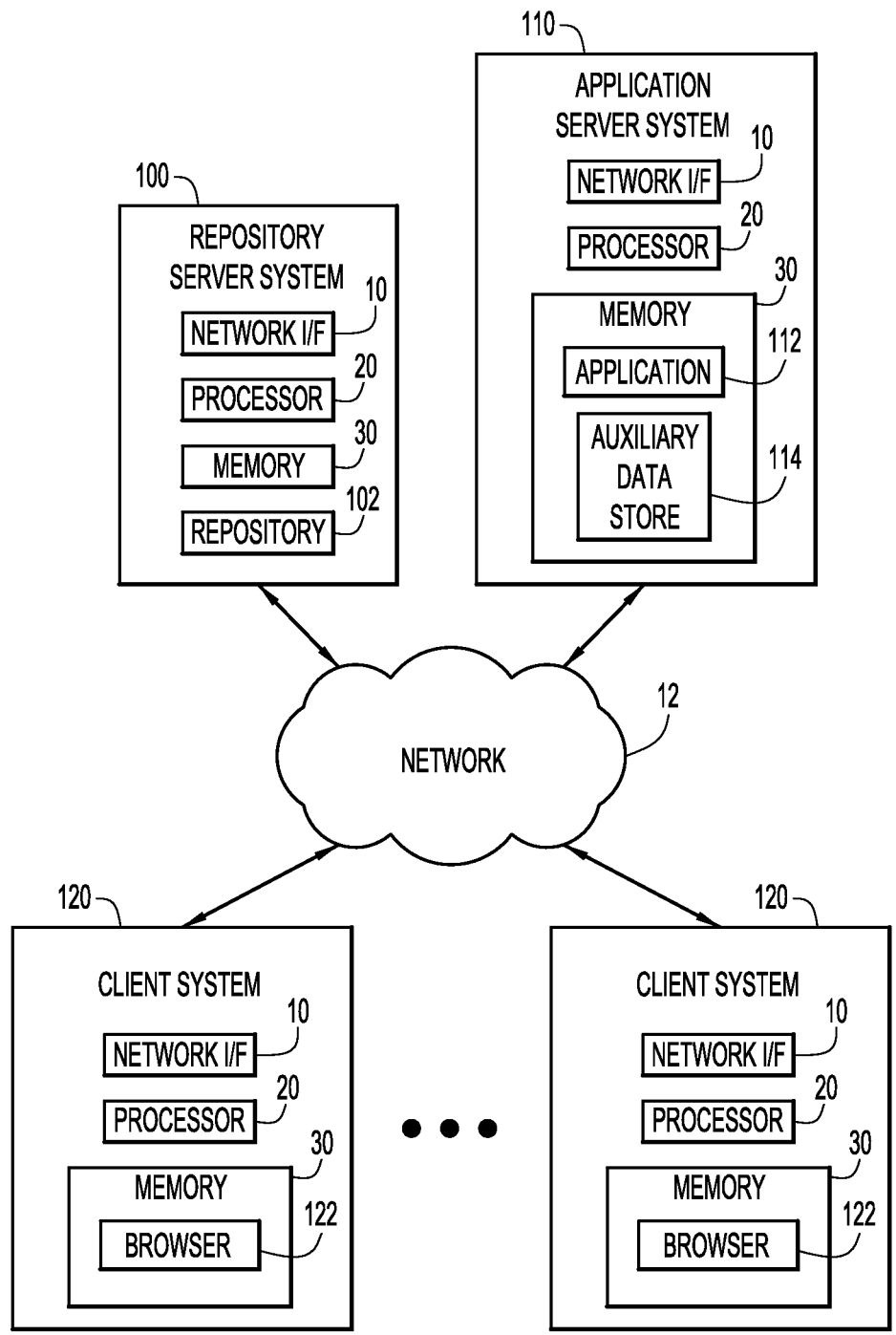
FIG. 1 is a diagrammatic illustration of an example computing environment for an embodiment of the present invention.

Present invention embodiments enable applications to extend the data-model of a content repository by creating and using one or more auxiliary data stores. For example, an electronic discovery application may create an auxiliary data store (ADS) for an email repository, where the data-model of the repository includes particular metadata (e.g., recipient and subject of each email), and the ADS includes additional metadata (e.g., sender, date/time, attachments, size, etc.). The ADS resides outside the repository.

One aspect of a present invention embodiment is a dual storage model, which safeguards against data loss or corruption due to disk failure or other errors. The content of the ADS, which resides outside the repository, may also be stored within the repository. The representation of the ADS content in the repository may differ from the representation in the ADS. For example, the ADS may contain one or more containers of data objects designed to facilitate access to the content, while the repository representation of the ADS contains a log (referred to as the data model extension log (DXL)) of the operations that created, modified, or deleted those objects. The log may be used to restore the ADS in the event of an error.

Another aspect of a present invention embodiment is to effectively extend a repository data model without affecting the original data model or requiring migration of existing data objects. The repository data model and the data model extensions (in the ADS) may evolve independently of each other. If this happens, they may become incompatible, which may cause the application to behave incorrectly if not detected. To avoid this, an embodiment may provide mechanisms that allow the application and the repository data model to be cognizant of each other and their current versions, and to synchronize so that their versions match. The application and repository may have a loose coupling that allows them to quickly detect version mismatches and partial failures in the software or hardware. The ADS may employ a transactional write-through policy with the repository, allowing inconsistencies to be detected quickly using checkpoints. If inconsistency is detected, the ADS may be rebuilt before being used again. However, if the ADS is no longer needed, the application may continue without restoring this consistency.

Still another aspect of a present invention embodiment is performance with low overhead. While restoring an ADS from the log may be expensive, the infrequency of failure limits the cost. In order to maintain synchronization between the ADS and log, the log may be updated each time the ADS is modified. A modified append-only policy for the log may be used to limit the overhead of updating the log and keep the throughput of repository writes high. Such a policy optimizes runtime performance. A strict append-only policy may cause the log, and therefore the cost of recovery, to grow monotonically. However, in some applications the cost may be bounded. For example, electronic discovery cases have a fixed life cycle (e.g., a statute of limitations may range from a few months to several years). Once this period has lapsed, data associated with the case may be cleared. This may be done efficiently using a bulk delete operation. Thus, fixed case life cycles may ensure that the DXL never becomes too cumbersome.

An example environment for present invention embodiments is illustrated in FIG. 1. Specifically, the environment includes repository server system 100, application server system 110, and one or more client or end-user systems 120. Repository server system 100, application server system 110, and client systems 120 may be remote from each other and communicate over a network 12.

Network 12 may be implemented by any number of any suitable communications media (e.g., wide area network (WAN), local area network (LAN), Internet, intranet, etc.). Alternatively, any number of server systems 100, 110 and client systems 120 may be local to each other, and communicate via any appropriate local communication medium (e.g., local area network (LAN), hardwire, wireless link, intranet, etc.).

Repository server system 100 may include repository 102 (e.g., an email repository and/or other content repository). Application server system 110 may include application 112 and auxiliary data store (ADS) 114. Application 112 (e.g., an electronic discovery application or other information processing application) uses information stored in repository 102. ADS 114 extends the repository data model and may provide application 112 with information about content stored in the repository beyond that contained in the metadata of the repository's data-model. Application 112 and ADS 114 may be implemented as separate processes on application server system 110. Alternatively, ADS 114 may be implemented as a component module with application 112 or other configuration. The repository, application, and/or ADS may be implemented across plural server systems. Alternatively, the repository, application, and/or ADS may reside on a client system 120 or other computer system.

Client systems 120 may include browser 122 to enable users to communicate with application 112 (e.g., via network 12). The client systems may present any graphical user (e.g., GUI, etc.) or other interface (command line prompts, menu screens, etc.) to receive commands from users and interact with application 112 and/or other modules or services.

Repository server system 100, application server system 110, and client systems 120 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., browser software, application software, ADS software, data-model extension framework software, repository server software, data-model extension log software, database software, communication software, etc.).

The client, application server, and repository server systems may include one or more modules or units to perform the various functions of present invention embodiments described below (e.g., ADS application interface functions, data-model extension framework functions, data-model extension log application interface functions, etc.), may be implemented by any combination of any quantity of software and/or hardware modules or units, and may reside within memory 30 of a server system and/or client systems for execution by processor 20.

Figure 2:
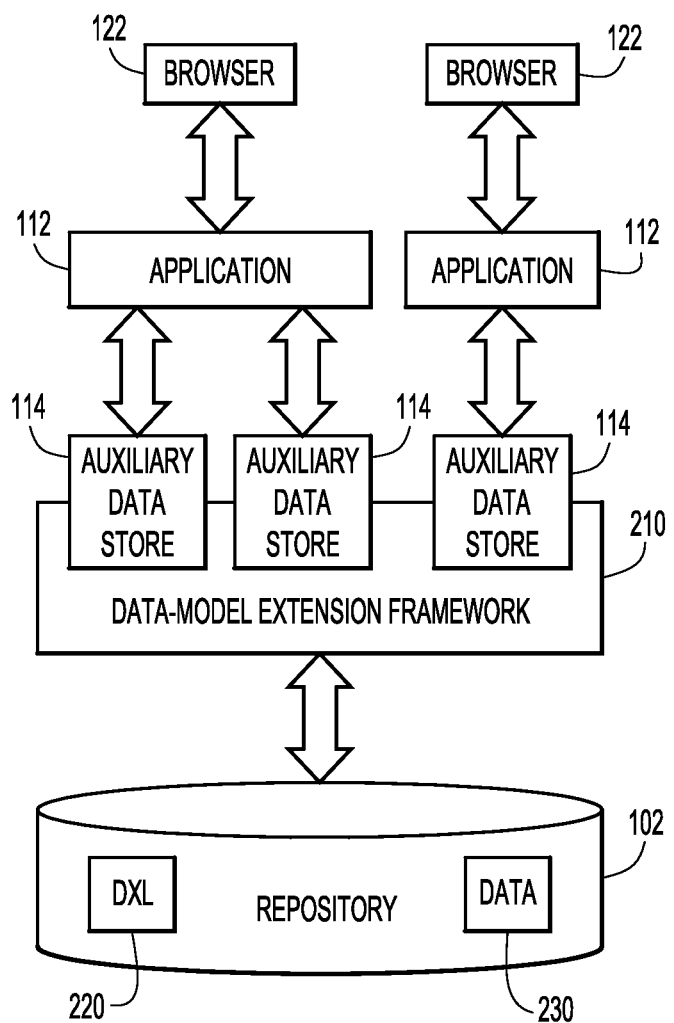
FIG. 2 is block diagram depicting an example architecture for auxiliary data store interactions according to an embodiment of the present invention.

A block diagram of an example architecture for auxiliary data store interactions according to an embodiment of the present invention is illustrated in FIG. 2. Users communicate with one or more applications 112 (e.g., via network 12, using browsers 122) that access, directly or indirectly, content of repository 102. Each application 112 communicates with one or more auxiliary data stores 114. Each auxiliary data store (ADS) interacts with the repository using data-model extension framework (DXF) 210, which may reside on application server system 110 and/or repository server system 100. The repository includes data 230 that conforms to an original repository data-model. The repository also includes data-model extension log (DXL) 220. DXL 220 augments the original repository data model and includes the definition of a structure that records the repository representation of the contents of ADSs 114. DXL 220 logs all operations performed on each ADS 114. Each log entry includes the operands of each operation. These operands may be stored in DXL 220 as serialized representations of ADS objects.

In addition to the operation and its operands, each entry in the DXL may store metadata about each object. This approach may be most efficient if the number of metadata items is large but each metadata item is small compared to actual content. By structuring the DXL in this way, multiple heterogeneous objects may be co-located in a single structure.

In an embodiment of the present invention, the DXL is a write-once append-only structure that disallows modification of existing entries. The DXL may enforce an append-only policy with an exception that when a predefined logical collection of documents or other objects (referred to as a "case") is deleted, all operations in the log related to that collection are simultaneously removed. A case may be, for example, documents related to a legal case or other matter. The DXL implements an application programming interface (API) that includes a bulk delete operation for a given case that performs this clean-up efficiently. The DXL provides an iterator so it can be read sequentially. Since the DXL supports only append operations, it is cost-efficient to write, scan, and synchronize the DXL with an ADS.

If any portion of the ADS is corrupted or lost, the ADS may be restored from the repository in its entirety before proceeding further. Data can be recovered from the repository by iterating through the DXL and replaying all operations that were originally performed to construct the lost or corrupted data structures and to get them to the state they were in before the failure occurred. For recoverability and data integrity, the ADS and the DXL may be kept in synchronization with each other.

Data-model extension framework (DXF) 210 stands between the repository and the applications that use it. This layer facilitates synchronization and other interactions between any ADS and the DXL. Each ADS implements a predefined API referred to as the data-model extension (DX) API, which allows the ADS to plug into the data-model extension framework (DXF). The DXF provides services including (1) definition of data model extensions, (2) storage and retrieval of data model extension objects in serialized form in the DXL, (3) deletion of entries in the DXL when an ADS is removed, and (4) version maintenance, and detection of any inconsistency between an application and the repository.

One or more auxiliary data stores may plug into to the DXF to extend an existing repository data model. Different analytics applications may provide different services and an ADS that one application creates may have different content, structure, and behavior than an ADS created by another application. An application may create and use an ADS according to the design that best suits its needs. By implementing the DX API, the ADS will be compatible with the data-model extension framework.

An example form of recording auxiliary data store operations in a data-model extension log (DXL) according to an embodiment of the present invention is illustrated in FIG. 3. The DXL is structured as a set of entries 310, each of which denotes an object manipulation operation on the ADS. Each entry 310 includes a tuple containing a case identifier 301 or other base object identifier, an offset 302, and an application-specific field containing a serialized object 303 (e.g., an XML string or other serialized object format specifying an operation and any operands). In the electronic discovery domain, case identifier 301 may correspond to a legal case or matter being litigated. Offset 302 of any entry 310 provides a way to uniquely identify the entry in the DXL, and acts as a sequence identifier for an iterator API. Serialized object 303 may indicate one or more operations and corresponding operands, including attribute names and values (key-value pairs) describing a particular object or a collection of objects. Objects represent auxiliary data (i.e., in addition to what is stored in the repository) generated by the application. For example, an entry 310 may include an operation that adds information about a custodian of an email (e.g., a sender or recipient of the email) and deletes information about another custodian, where the information about the added custodian is represented as a serialized custodian object having an [id] attribute with a value of 1407, a [firstName] attribute with a value of "Jane," a [lastName] attribute with a value "Smith," and an [email] attribute with a value of "jsmith@ibm.com."

If a partial failure occurs (e.g., the loss or corruption of a single ADS), there is no need to replay the entire DXL and rebuild every ADS. To enable recovery from a partial failure, a fourth field 304 may be included in the tuple for an entry 310. The fourth field 304 identifies the ADS in which each entry is stored. Given such a field, the DXL may provide an iterator that only retrieves entries for a specific ADS. For example, to enable recovery from a failure of an ADS that stores custodian-related objects, all custodian-related operations in the DXL can have their type set to 'Custodian' which enables the creation of an iterator that only retrieves custodian-related operations in the DXL.

Each ADS 114 may likewise be structured with entries corresponding to one or more data objects with associated attributes. Depending on the number of unique objects in the data model extension and the size of each object, the ADS may either store one object in an entry or it may store multiple objects in a single entry. One approach or the other may be adopted on the basis of runtime performance. If the entire set of objects (and their attributes) will fit in memory at runtime, then all of the objects may be stored in a single entry in the ADS. If one or more objects in the set are updated, the entire entry is replaced with a new set containing the updated objects. On the other hand, if the number and/or size of objects is large, each object may have a dedicated entry in the ADS. A type attribute is included with each entry. At runtime, query results are retrieved directly from the ADS. If at any point, the ADS is inconsistent with the repository, it is reconstructed using the content stored in the repository. The recovery process can either be a single step (if all objects are stored in a single entry) or incremental (if each object is in a separate entry).

Each ADS has an associated version identifier used to ensure consistency with the repository data model. Each time the content in an ADS is updated, a version identifier is generated and recorded. For example, the ADS may be stored as a file on disk, and the version identifier may be a combination of the current timestamp and the checksum of the file upon updating the ADS. The version identifier is also stored in the repository. The version stored in the ADS and the version stored in the repository may be required to be identical after every write. This provides a way to check for consistency between the ADS and the repository so that recovery may be initiated if the ADS and repository are inconsistent. If recovery is needed, the new version of the ADS is recorded in the repository once recovery is completed.

Application 112 may evolve over time (e.g., to support new features). In the course of this evolution, an application may alter the structure of its data, including the structure of its ADS. Likewise, the data model of repository 102 for data 230 may evolve. Data model changes over time and may require structural changes to the DXL and eventually the DXF and DX API. Changes to an application, repository data model, or both may create incompatibilities between applications and the repository data model. These incompatibilities, if not detected and accounted for, may affect data access and even failure recovery. To detect and manage such incompatibilities the version of the application that created each case (e.g., indicated by case identifier 301) is recorded (e.g., within ADS 114 and/or repository 102).

Manners of handling ADS and DXL evolution include a backward compatible API and migration. If the application changes while maintaining a backward compatible API (i.e., the application is capable of reading from or writing to existing data structures), then the application data (e.g., ADS data) may remain in the same format. If the new version is not backward compatible, the application data may be migrated before being used by the new version of the application. Migrating the ADS data includes updating the DXL so that each entry corresponding to a case identifier 301 of a migrated case conforms to the new ADS structure. For cases that are no longer in use, migration may not be necessary. If, on the other hand, the data model evolves and the repository API is not backward compatible, the DXL itself may need to be migrated before it can be accessed. As part of any data model upgrade, the backend will also be migrated. Migration may be expensive if done universally at initialization time, and if done partially at run-time, may increase query response times. Backward compatible APIs are generally preferred because they allow multiple versions of auxiliary and/or repository data to co-exist simultaneously in their respective structures. The DXF need not participate in the migration process of either the ADS or the DXL. Rather, it may provide APIs for version management, which applications can use to handle versioning and detect conflicts.

An ADS may be stored in any manner. Access patterns of objects in a data model extension may be taken into account for determining how an ADS is stored. For example, if real-time querying is required, the ADS may be placed in a fast storage system so that no repository access is required when executing a query. For example, the ADS may be stored on a disk local to application 112, and may be cached in memory (e.g., when the application starts, when the ADS is first accessed, etc.). To support failure recovery, ADS operations may still be tracked in the repository.

Applications 112 may allow users to issue various types of queries to the repository as well as to ADSs 114. Some types of user queries may be answerable using just an ADS, without accessing the repository. This is possible if all attributes the user is interested in are stored in the data model extension (located entirely in the ADS). The runtime performance of these queries is high. Other types of queries may be answerable using both the ADS and the repository. The application designer may organize the data based on expected access patterns and desired query performance.

If the data model spans the repository and an ADS, the content stored in each of them may be kept consistent with the content of the other by synchronizing repository and ADS from time to time. The frequency of synchronization between the repository and ADS may be determined by the application. Runtime performance tends to increase with lower synchronization frequency, while data recoverability tends to increase with higher synchronization frequency. For maximum recoverability (i.e., no data loss in the event of failure), synchronization may be performed after every write operation. However, this adds per-operation overhead that can limit runtime performance. Alternatively, an application may adopt less aggressive synchronization strategies. For example, synchronization may occur only in certain situations (e.g., when a case is first opened for use). Other policies include synchronizing after a certain number of operations are performed, after a certain amount of data is written, etc. Such policies may improve query throughput, but if failure occurs any data change that occurred after the last successful synchronization will be lost. The application may determine the policy appropriate for its use.

Figure 4:
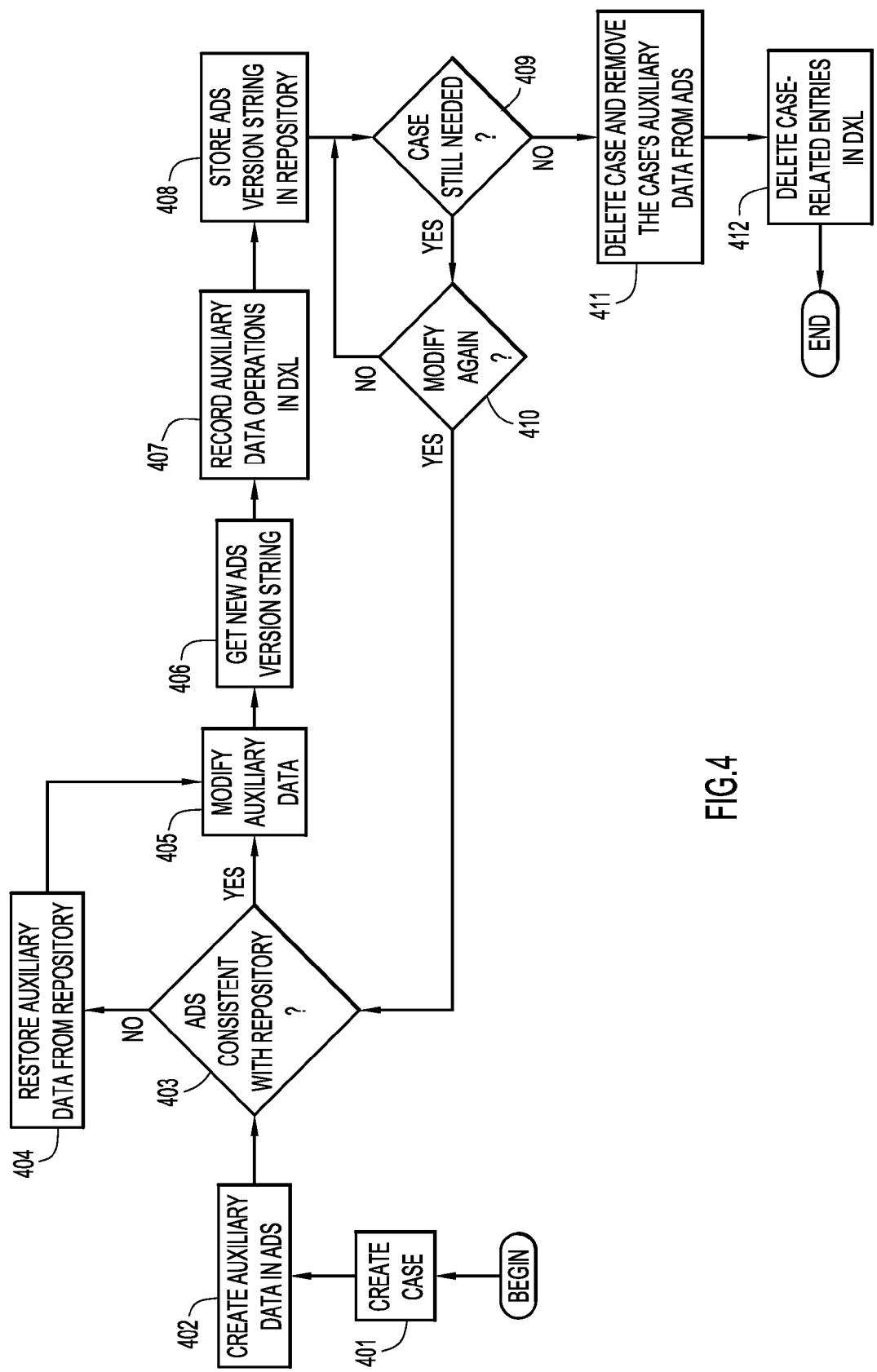
FIG. 4 is a flow diagram illustrating an example manner of creating and modifying an auxiliary data store according to an embodiment of the present invention.
Figure 5:
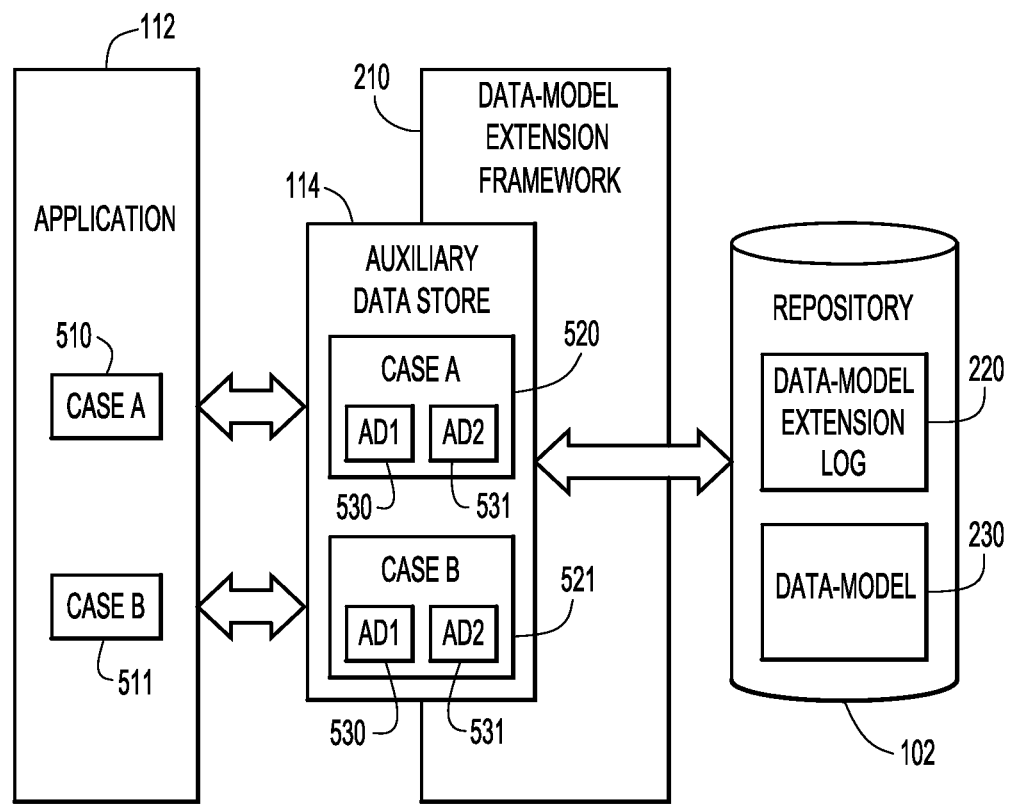
FIG. 5 is block diagram depicting auxiliary data structures for case information according to an embodiment of the present invention.

An example manner in which an application creates and modifies an ADS according to an embodiment of the present invention is illustrated in FIGS. 4 and 5. Initially, at step 401, application 112 creates a case 510 (FIG. 5). A case defines to a logical collection of documents (e.g., documents related to a legal matter or other subject) and related data. These data may include content of the documents, metadata for the documents of the case, metadata pertaining to the case, and the like. Case data may include data 230 residing in the repository according to the data model, and/or auxiliary data residing externally to the repository in ADS 114. An application may maintain one or more cases concurrently, e.g., cases 510 and 511 (FIG. 5).

At step 402, the application creates auxiliary data 520 for case 510 in ADS 114. Auxiliary data 520 includes (instances of) one or more auxiliary data structures, e.g., auxiliary data structures 530 and 531 (FIG. 5). The ADS includes auxiliary data structures for each case For example, auxiliary data 521 for case 511 includes separate instances of auxiliary data structures 530 and 531. The auxiliary data structures may be persisted locally (e.g., locally to application server 110), and also in repository 102 as entries in data-model extension log (DXL) 220. Case metadata that are defined by the repository data-model are stored in repository data 230.

Before interacting with the repository, the data-model extension framework (DXF) determines whether the ADS is consistent with the repository at step 403. If it is not, then the application initiates recovery at step 404, and the ADS is rebuilt using the contents previously stored in the repository. This ensures that the ADS and repository are in sync with each other. Once consistency is confirmed (with or without recovery), auxiliary data may be augmented, modified, or deleted at step 405. After every such operation, a new ADS version (represented, e.g., as a string) is assigned at step 406, and the operation is written to DXL 220 at step 407. The new ADS version is recorded in the repository at step 408.

At step 409 the application determines whether to retain the case. For example a case may have a predefined interval of time during which it may be needed. If the case is retained, the application determines at step 410 whether another modification is to be performed. If so, processing returns to step 403. Otherwise processing returns to step 409.

If the case is no longer to be retained at step 409, the application deletes the case and removes all of the case's auxiliary data from the ADS at step 411. The entries related to the case in the DXL (now obsolete, since recovery will no longer be needed) are removed at step 412.

It will be appreciated that the embodiments described above and illustrated in the drawings represent only a few of the many ways of implementing embodiments for extending content repository data models using auxiliary data stores.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for extending any content repository (e.g., email repository, file system, archive, database, etc.) data models using auxiliary data stores. An auxiliary data store may contain any type of content (e.g., text, numeric data, or any other metadata or data) generated in any manner using any sources (e.g., extracted from repository data 230, extracted from another data source, generated by an annotator, etc.). An auxiliary data store may include content included in the data model of repository 102 (e.g., the auxiliary data store may operate as cache) and/or content not included in the data model of repository 102 (e.g., statistics, content extracted from documents in the repository, etc.). An auxiliary data store may include information about individual data objects of a case (e.g., sender of each email, creator of each file, etc.) and/or information aggregated over all or some of the objects (e.g., total size of the data objects, average number of recipients of emails from each sender, etc.). Auxiliary data store content may be queried at any granularity (e.g., individual entries, averages, totals, sub-totals, etc.).

Any kind of application (e.g., electronic discovery, business intelligence, data mining, data warehousing, etc.) may create and use an auxiliary data store. An auxiliary data store and a representation of its content within a repository may have any combination of structures (e.g., a log of operations of serialized objects, an object oriented representation, etc.), where the auxiliary data store and repository representations of the auxiliary data store content may be the same or different.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", with and the like, when used in this specification, specify' the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of extending a content repository comprising:
   creating an auxiliary data store outside of a content repository, wherein the content repository includes a data model for defining attributes to be stored for data objects in the content repository, and wherein the attributes for data objects stored in the content repository are only those attributes defined by the data model;
   extending the data model of the content repository by storing, in the auxiliary data store, auxiliary data for data objects in the content repository, wherein the auxiliary data includes one or more attributes for the data objects of the content repository that are not defined by the data model;
   storing version information for the auxiliary data store in the auxiliary data store and content repository; and
   in response to receiving a request for an operation against the auxiliary data store:
   determining consistency between the auxiliary data store and content repository by comparing the version information in the auxiliary data store against the version information in the content repository;
   applying the operation against the auxiliary data store and storing a record of the operation including an object identifier and operands in a log in the content repository in response to the version information in the content repository and auxiliary data store indicating a same version, wherein the object identifier comprises an identifier of a collection of data objects in the content repository; and
   reconstructing the auxiliary data store in entirety based on records of operations against the auxiliary data store in the log in response to the version information in the auxiliary data store and the content repository indicating a different version.

2. The computer-implemented method of claim 1, wherein the records of operations against the auxiliary data store are appended to the log in the content repository and are immutable.

3. The computer-implemented method of claim 1, wherein a framework mediates interaction between the auxiliary data store and content repository, and storing the record of operation comprises storing, via the framework, auxiliary data objects in serialized form.

4. The computer-implemented method of claim 3, further comprising:
   deleting from the auxiliary data store the auxiliary data corresponding to a collection of data objects in the content repository; and
   deleting, via the framework, records of operations in the log in the content repository comprising an identifier of the collection of data objects.

5. The computer-implemented method of claim 4, wherein the framework mediates interaction between a plurality of auxiliary data stores and the content repository, and the framework stores version information for each of the plurality of auxiliary data stores and records of operations against each of the plurality of auxiliary data stores in the log.

\* \* \* \* \*